July 29, 1958

L. DEBUIT 2,844,971

LOCKING MECHANISM WITH PASSAGE OF THE MOBILE
MEMBER THROUGH A DEAD POINT POSITION

Filed Oct. 4, 1954

INVENTOR.
Louis DEBUIT

BY *Heinrich Rothschild*

Attorney

July 29, 1958     L. DEBUIT     2,844,971
LOCKING MECHANISM WITH PASSAGE OF THE MOBILE
MEMBER THROUGH A DEAD POINT POSITION
Filed Oct. 4, 1954     2 Sheets-Sheet 2
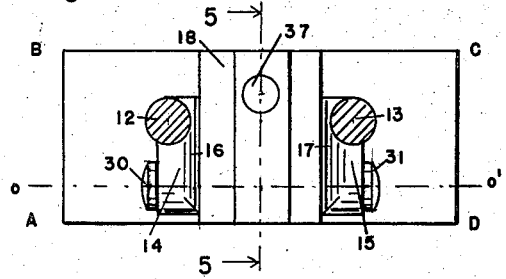
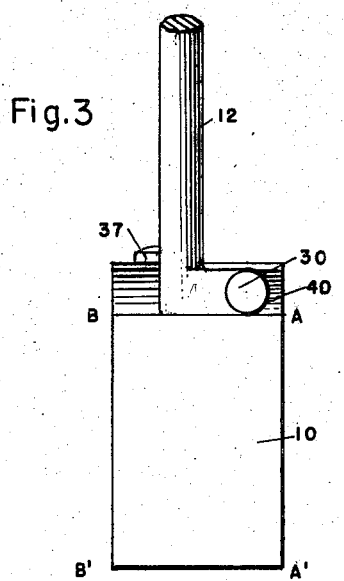
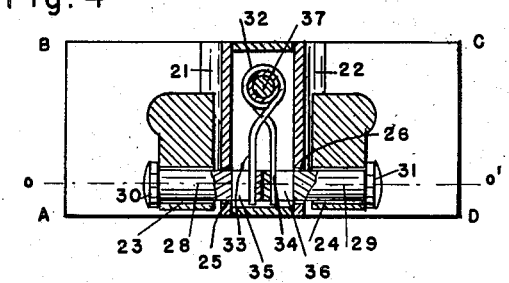
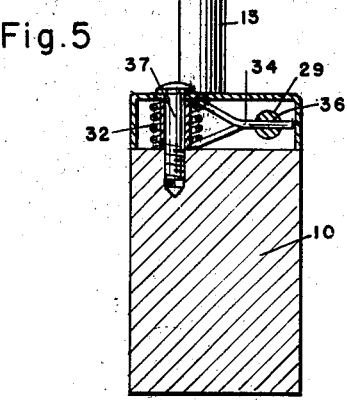
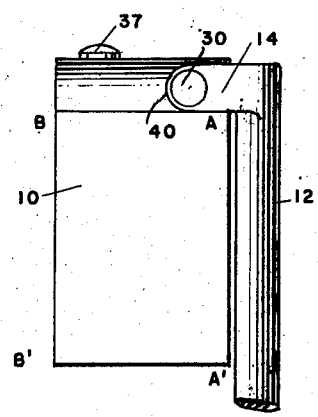
INVENTOR.
Louis DEBUIT
BY
Attorney

United States Patent Office 2,844,971
Patented July 29, 1958

2,844,971
LOCKING MECHANISM WITH PASSAGE OF THE MOBILE MEMBER THROUGH A DEAD POINT POSITION

Louis Debuit, Grenoble, France, assignor to Etablissements Merlin & Gerin, Grenoble, France Application October 4, 1954, Serial No. 460,119

Claims priority, application France December 23, 1953

1 Claim. (Cl. 74—527)

The present invention relates to a locking mechanism. More particularly, the invention relates to a locking mechanism operably associated with two relatively movable members, so as to, in effect, constitute a lock-hinge arrangement.

Specifically, the invention relates to an arrangement in which a member is mounted for movement between two locking positions on a base member, and in passing between said positions the movable member moves through a dead center position. The arrangement is such that the locking mechanism includes at least one pair of structural elements, each shaped with a generally cylindric or cylindrical locking surface, with the locking surface of one element being concave and that of the other element being convex. The locking surfaces are shaped and disposed for interengagement with one another, with the concave surface embracing the convex surface, one element of each pair being stationarily mounted with respect to the base member, and the other element being embodied with the movable member so that the locking surfaces are disposed with their generatrices perpendicular to the axis of movement of the movable member, the invention further including pivotal means about which the movable member can move so disposed relative to the locking surfaces that the longitudinal extension of the pivotal means passes through the same, whereby there is a locking engagement between the surface of the movable member with the surface on the base member in one position of the former relative to the latter and again, upon swinging of the movable member through 180° in the reverse position of the movable member relative to the base member, the invention further including elastic means associated with the movable member, operable to permit deflection of the same along the axis of the pivotal means during rocking or swinging movement of the pivotal member into and out of both locking positions, so that the locking surface of the movable member can turn about the pivotal axis relative to and at the location of the locking surface on the base member, and in which the respective locking surfaces are so shaped that in the engaged position planes tangential to the embraced and embracing surfaces along at least a generatrix of contact between the surfaces are approximately parallel to the pivotal axis of the movable member.

When in the ensuing specification and in the claims the term "cylindric" is employed in connection with the configuration of the locking surfaces, this term is to be understood in the broader geometric sense, meaning thus a surface generated by the motion of a straight line, the generatrix, which remains parallel to itself and constantly intersects a curve, the directrix. This curve or directrix may conveniently be a part of a circle, a semicircle or approximately so, or a segment of a parabola or ellipse or may be otherwise shaped.

In locking mechanisms or lock-hinge constructions according to the prior art, the interlocking action is created by the expansion of spring means with this being of primary importance, and intended to force a rib or ribs on one member into engagement with a groove or grooves on the other member.

According to the present invention, the elastic means associated with the movable member and which, in effect, is expanded on relative movement between the members is so arranged that the expansion of the elastic or spring means is of secondary importance, the interlocking action of the present invention being obtained solely or at least principally by the encasing or nesting of the embraced locking surface or surfaces within the embracing surface or surfaces, the action of the spring means only facilitating the return to neutral of the mechanism.

In further development of the invention, the shapes of the co-operating locking surfaces are approximately conformable to each other, deviate however from each other in that, in the engaged position of the surfaces, contact is made not on the whole surfaces of the cylinder sectors but only along individual generatrices or lines of contact. This is achieved by shaping the embraced surface with a fuller profile than the embracing surface. In the case of a circular cylindric sector, or a semi-cylinder, the radius of the embracing, concave cylindric surface will be designed slightly smaller then the radius of the embraced, convex cylindric surface. These surfaces will then be so disposed that in the engaged position the radii to the lines of contact or, in other words, the tangential planes along said lines of contact make a small angle with each other. This generatrix of contact is so chosen that, in the engaged position, the plane through this generatrix of contact tangentially of the embraced surface is nearly parallel to the pivotal axis, deviates, however, therefrom by a small angle, preferably smaller than the angle of friction between the embracing and embraced surfaces. The force for disengaging the surfaces from each other is applied at a noticeable distance from the pivotal axis to the surface at the mobile member, in the case specifically described and illustrated hereinafter, to the embraced convex surface.

According to a further development of the invention, the mechanism is further so designed that any movement of the embraced piece in the direction of the pivotal axis will take place only through deflections caused by the play of elastic deformation and parasitic torsional strains of the mechanism. In other words, the mechanism is so designed that in the locking positions any movements of the parts would be impossible should the elements of the mechanism be non-deformable solids. However, the elements have elastic characteristics such that they are sufficiently close to the limit where elastic deformations due to parasitic torsional strains are sufficient to allow initiation of the disengaging motion.

Once this motion has been started, it may readily be continued since the contact is made only at the intersection of lines the tangential planes through which form an increasing angle with the pivotal axis.

Therefore it is an object of the present invention to provide a locking mechanism, or what can be termed a "lock-hinge construction" which includes in combination with a stationary base member, means forming mutually spaced, oppositely facing concave locking surfaces, pivot means having an axis passing through the axes of said surfaces and extending beyond the respective surfaces, a swingable member including spaced interconnected legs, each terminating in a head laterally offset from the axis of the legs, each head including laterally offset portions extending toward one another and terminating in a convex locking surface, said heads having apertures therethrough in alignment with one another, said pivotal means passing through said apertures and means including remote end portions on the pivotal means preventing disassociation of the same from the apertures and constraining the said heads to move toward one another whereby swinging movement of the movable member relative to the base deflects the said heads apart to permit movement of the movable member to a 180° reverse position, whereupon the convex surfaces on the heads reengage the concave locking surfaces on the base member to relock the movable member.

These and other features and objects of my invention will become apparent as the now ensuing specific description of my invention proceeds in which the invention will be described with reference to the accompanying drawings which form part of this specification and which by way of example illustrate an embodiment of my invention. These drawings, however, are to be understood explicative of my invention but not limitative of its scope. Other embodiments incorporating the principle underlying my invention are feasible without departing from the spirit and ambit of my appended claim.

In the drawings:

Fig. 2 is a sectional view along line 2—2 of Fig. 1;

Fig. 3 is a side view of the mechanism in the position of Fig. 1, a fraction of the mobile member only being shown;

Fig. 4 is a section along line 4—4 of Fig. 1;

Fig. 5 is a section along line 5—5 of Fig. 2;

Fig. 7 is a side view of the mechanism with the mobile member, shown in fraction, in the lower locking position.

Figure 1:
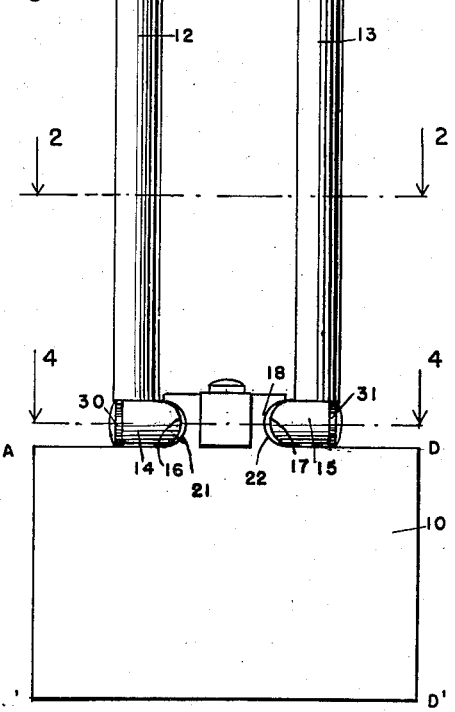
Fig. 1 is a front view of a locking mechanism of the invention, the mobile member being in the upper one of the locking positions.

In the drawings, a tool, utensil, or implement of any type is schematically indicated by the parallelepiped ABCDA′B′C′D′, generally designated by 10 to which the mobile element in form of a handle or rocking lever 11 is secured, pivotal about the axis o—o′. This pivotal axis, in the instance illustrated, is parallel to the direction AD, while the longitudinal extension of the handle, in the two locking positions, is respectively parallel to the directions AA′ and A′A, which are opposed to each other. In the one position, Figs. 1 to 5, the handle is in the extension of the tool, and in the other position, Fig. 7, the handle is turned down upon the side ADD′A′ of the tool.

The handle or rocking lever may be formed as the illustrated embodiment shows, as a rod or tube of steel or any other elastic metal or material of circular cross section. The rocker lever 11 is bent into U-form with the legs 12, 13; a certain elasticity thus being imparted to the legs which tends to return the legs into an untensioned position when they had been deflected relatively to each outwards or inwards.

At the free end of each leg there is provided a piece 14, 15 or structural element, each shaped with a convex cylindric locking surface 16, 17, respectively. The directrix is a half-circle and the generatrices are perpendicular to the pivotal axis o—o′ and, in the embodiment illustrated, perpendicular to the direction of the length extension of the rocker lever.

The structural elements 14, 15 thus comprise a semicylindrical portion extended from a straight portion, generally of rectangular shape. The surface ABCD of the tool or implement is provided with a structural element in form of a projection 18, of one piece with or secured to the tool 10 and shaped with two concave cylindric locking surfaces or grooves 21, 22 opposite and approximately conformable to the convex cylindrical locking faces 16, 17, respectively.

The profile of these cylindric grooves 21, 22 is also semi-circular and so dimensioned that the convex surfaces 16, 17 may be conveniently lodged and engaged therein.

As Fig. 4 best illustrates, the pivotal axis o—o′ is so disposed relatively to the locking surfaces 16, 21, and 17, 22, that it penetrates the same within their longitudinal extensions. Bores 23, 24, and 25, 26, are correspondingly shaped in the pieces 14, 15, of the rocker lever and in the projection 18, coaxial with the pivotal axis o—o′. Pivot pins 28, 29, respectively, are housed in these bores, axially displaceable therein, thus serving as pivots of the rocker lever 11.

The rocker lever or handle 11 is so designed that its legs 12, 13, are elastically biased inwards, so that when the convex cylindric surfaces 16, 17, are engaged in the concave cylindric surfaces 21, 22, respectively, they are held therein under considerable elastic locking forces, effective in the direction of the pivotal axis.

Through the arrangement of the pivots with their common axis penetrating the cylindric surfaces within their length extensions, it is possible to hold the convex surfaces 16, 17 in locking engagement with the concave surfaces 21, 22, respectively, in a certain position relatively to the base member of the tool, such as the position of Figs. 1 to 5 and again, on rocking the handle about 180°, in the reversed position of the handle or of its locking surfaces relatively to the concave locking surfaces of the base member, Fig. 7.

Figure 6:
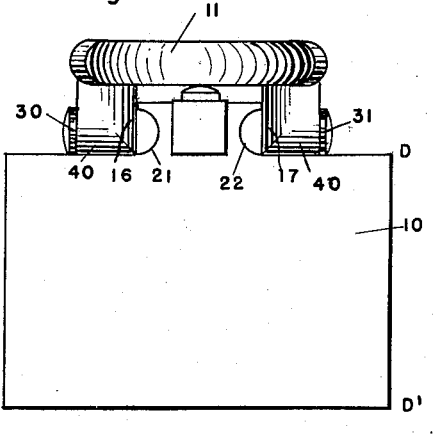
Fig. 6 is a front view of the mechanism with the mobile member in an intermediate position.

In the intermediate positions, the median being for instance shown in Fig. 6, the turning force exerted on the handle will, with a component in the direction of the pivotal axis o—o′, lift the convex locking surfaces out of engagement, while the ends of the legs 12, 13, through their elasticity, and the pivot pins 28, 29, since they are axially displaceable, are yielding in the direction of the pivotal axis.

In the locking positions, the inner ends of pivot pins 28, 29 are in contact with each other, as Fig. 4 illustrates, whereas their heads 30, 31 may bear against the pieces 14, 15. The pins are strongly urged together, into or towards the position shown in Fig. 4, by means of a spring 32 the ends 33, 34 of which are inserted into slots 35, 36, respectively, shaped within the pins 28, 29, near their inner ends. Spring 32 is wound about a pin 37 secured in the projection 18.

As Fig. 7 illustrates, the pieces 14, 15 of the rocker lever 11, at which the cylindric locking surfaces 16, 17 are shaped vertically of the pivotal axis o—o′, form lateral extensions or projections of the legs 12, 13 with the pivots disposed near the free ends of the extensions. It is thus possible to turn, in one of the locking positions, Fig. 7, the rocker lever down, upon the face AA′D′D of the base member 10. The legs 12, 13, are designed sufficiently long to ensure, on actuation of the rocker lever, a turning moment of sufficient magnitude to overcome the elasticity of a highly tensioned mechanism.

The ends of the legs 12, 13 or pieces 14, 15, about which the handle or rocker lever is tilted, may be shaped with a semicylindric surface, coaxial with the pivotal axis as Figs. 3, 6 and 7 illustrate at 40.

Figure 8:
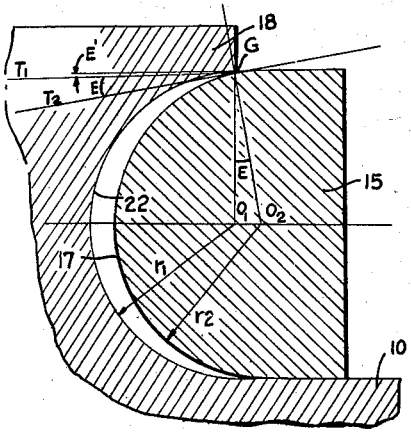
Fig. 8 is an elevational section, on an enlarged scale, of the structural elements with the locking surfaces in engaged or locking position.

In order to reduce the friction between the locking surfaces, when the mobile locking surfaces are to be turned out of engagement with the stationary surfaces, the surfaces of the pair are approximately conformable to each other, deviate however from each other in that the embraced convex surface is of a slightly fuller profile than the embracing concave surface. This is achieved, as Fig. 8 illustrates on an enlarged scale, by making the radius $r_1$ of the profile of the embracing, concave surface 22 slightly smaller than the radius $r_2$ of the profile of the embraced, convex surface 17. Since both locking surfaces 17 and 22 in the engaged locking position end at the lower side tangentially into a straight plane viz. the contact faces at the underside of pieces 14 and 15 and the bearing surface of the base member, the center of the radius $r_2$ lies slightly above and outside of the center of the radius $r_1$. At the upper side, contact is thus made along a generatrix G, the plane through which, tangentially of the embracing surface is slightly inclined towards the pivotal axis o—o' consequently, the tangential plane along the contact generatrix of the embraced surface is inclined backwards of the pivotal axis, relatively to the tangential plane of the embracing surface. If, consequently, a turning moment about this axis is applied to legs 12, 13, the force in this tangential plane will exert upon the end piece a component parallel to the direction of the pivotal axis, a component which will tend to lift or assist in lifting the embraced piece, 14 and 15, out of engagement with the groove or channel 21, 22, respectively.

Consequently, at the transition from one locking position, Figs. 1 to 5, into the other locking position, Fig. 7, through the position of Fig. 6, and conversely, the embraced surfaces will be lifted under elastic deformation of the U-shaped rocker lever out of engagement with the concave surfaces, as Fig. 6 illustrates, and thereon, will be snapped back into locking engagement through the elasticity of legs 12, 13, when the other locking position is reached, where the direction of the convex locking surfaces relatively to the direction of the concave locking surfaces is reversed.

In the embodiment illustrated, the cylindric locking surfaces at the rocker lever are shown extended transversely of the length extension thereof. The generatrices of these surfaces may however be otherwise disposed, for instance in the direction of the length extension of the rocker lever, instead of transversely thereof. This holds also true for the locking surfaces stationary at the base member. Forms and disposition of the elements of the mechanism then are correspondingly to be changed.

Locking surfaces may also be disposed at only one of the legs of the rocker lever, the other leg then being merely pivoted at the base member and held against axial displacement by any convenient means.

I claim:

A locking hinge arrangement including a stationary element and a swingable element, one of said elements including a portion having a planar surface and a projection extending therefrom, said projection having oppositely facing, parallel, generally half cylindric concavities, each concavity having one side tangential to said planar surface, the other of said elements including spaced portions having parallel generally half cylindric convexities of slightly greater dimension than said concavities and extending one toward each said concavity, means applying resilient force to one of said elements so as to urge the respective concavities and convexities toward one another, a pivot pin at right angles to said convexities at one end thereof and parallel to said planar surface to position said convexities to normally extend into and be embraced by said concavities, the axis of said pivot pin being disposed parallel to said planar surface and located at a distance therefrom equal to the radius of said convexities, said planar surface being tangential to the curves defining said respectively cooperable concavities and convexities, and the said dimensions of said convexities being such that the planes containing the tangents to each convexity at its lines of contact with the corresponding concavity remote from said planar surface are substantially parallel to said planar surface whereby when said convexities are embraced by said concavities said convexities will be pressed by a force substantially along diameters of said convexities against said planar surface.

References Cited in the file of this patent

UNITED STATES PATENTS

| | | |
|---|---|---|
| 945,662 | Woods | Jan. 4, 1910 |
| 996,764 | Hite | July 4, 1911 |
| 1,372,242 | Mepsted | Mar. 22, 1921 |
| 1,885,384 | Snow | Nov. 1, 1932 |
| 2,147,471 | Tyrrell et al. | Feb. 14, 1939 |